United States Patent
Schmidt et al.

(10) Patent No.: US 6,816,971 B2
(45) Date of Patent: Nov. 9, 2004

(54) SIGNATURE PROCESS

(75) Inventors: Ernst Schmidt, Ismaning (DE); Burkhard Kuhls, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 795 days.

(21) Appl. No.: 09/792,053

(22) Filed: Feb. 26, 2001

(65) Prior Publication Data

US 2002/0120856 A1 Aug. 29, 2002

(30) Foreign Application Priority Data

Feb. 25, 2000 (DE) .......................................... 100 08 974

(51) Int. Cl.⁷ .............................................. G06F 17/00
(52) U.S. Cl. ........................ 713/189; 713/187; 713/193
(58) Field of Search ................................. 713/189–194, 713/200–201, 168–172, 182–188

(56) References Cited

U.S. PATENT DOCUMENTS 6,748,541 B1 * 6/2004 Margalit et al. ............ 713/201
6,754,712 B1 * 6/2004 Valencia ..................... 713/201
6,754,832 B1 * 6/2004 Godwin et al. ............. 713/201

OTHER PUBLICATIONS

Nelson, A design pattern for autonomous vehicle software control architectures, Computer Software and Applications Conference, 1999, Proceedings, pp. 172–177.*
Moon, Vehicle control systems–reliability through simplicity, Safety Critical Software in Vehicle and Traffic Control, IEE Colloquium on, Feb. 13, 1990, 3/1 –310.*
Silva et al., A reconfigurable mission control system for underwater vehicles, OCEANS '99, MTS/IEEE, Riding the Crest into the 21st Century, vol. 3, Sep. 13–16, 1999, pp. 1088–192, vol. 3.*

* cited by examiner

Primary Examiner—David Jung
(74) Attorney, Agent, or Firm—Crowell & Moring LLP

(57) ABSTRACT

In a process for ensuring the data integrity of software for influencing operation of a control unit of a motor vehicle, a pair of keys is provided for encrypting and decrypting electronic data. The first key is stored for access by a control unit in the motor vehicle, and software which is to be imported is signed by means of the second key. The signed software is imported into the memory of the control unit and the signature of the software is checked by means of the first key. The signature is accepted if the check has a positive result.

20 Claims, 5 Drawing Sheets

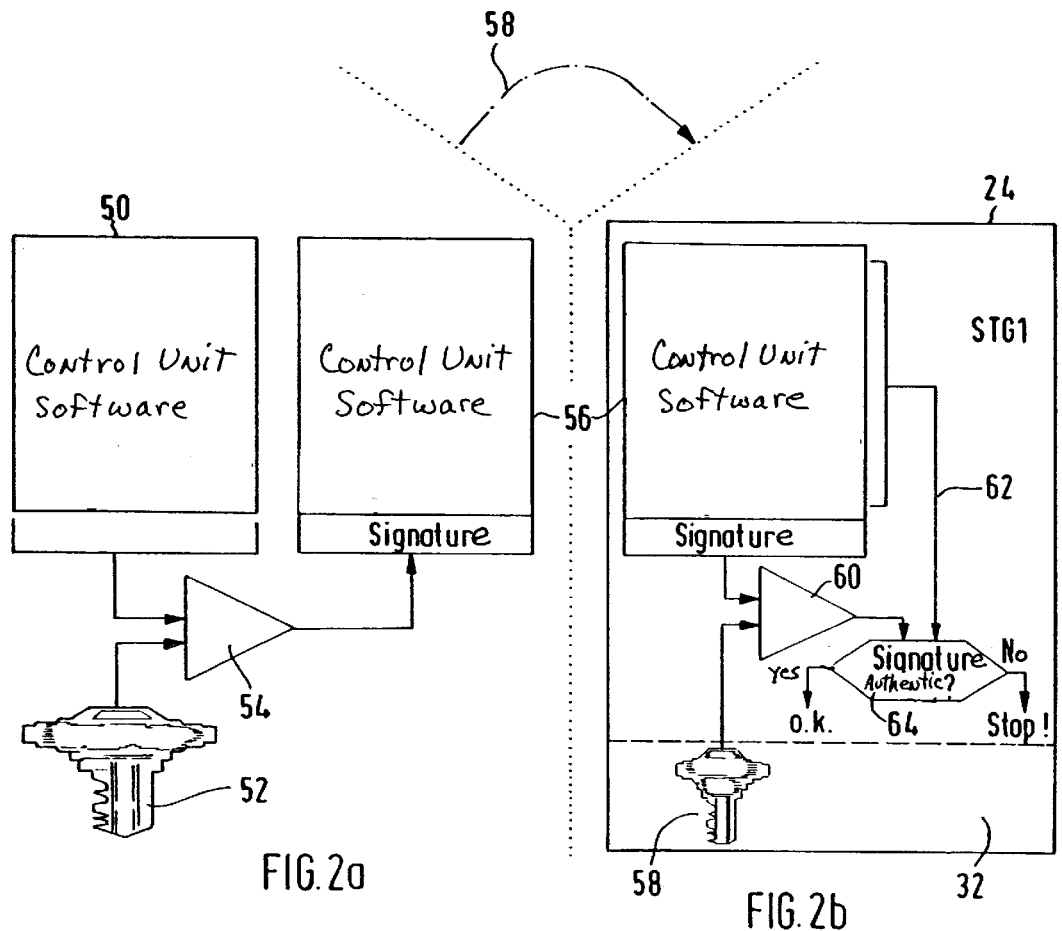
FIG. 2a          FIG. 2b
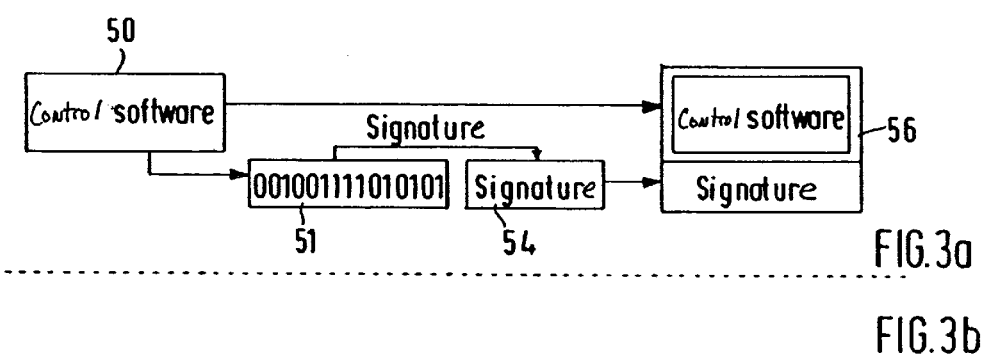
FIG. 3a
FIG. 3b
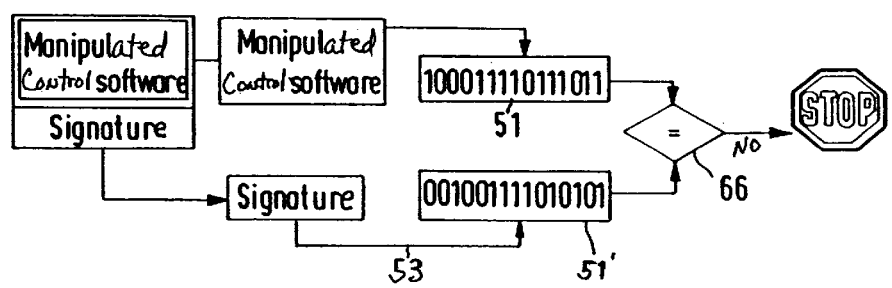

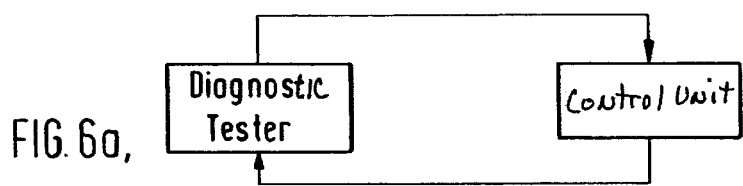
FIG. 6a,
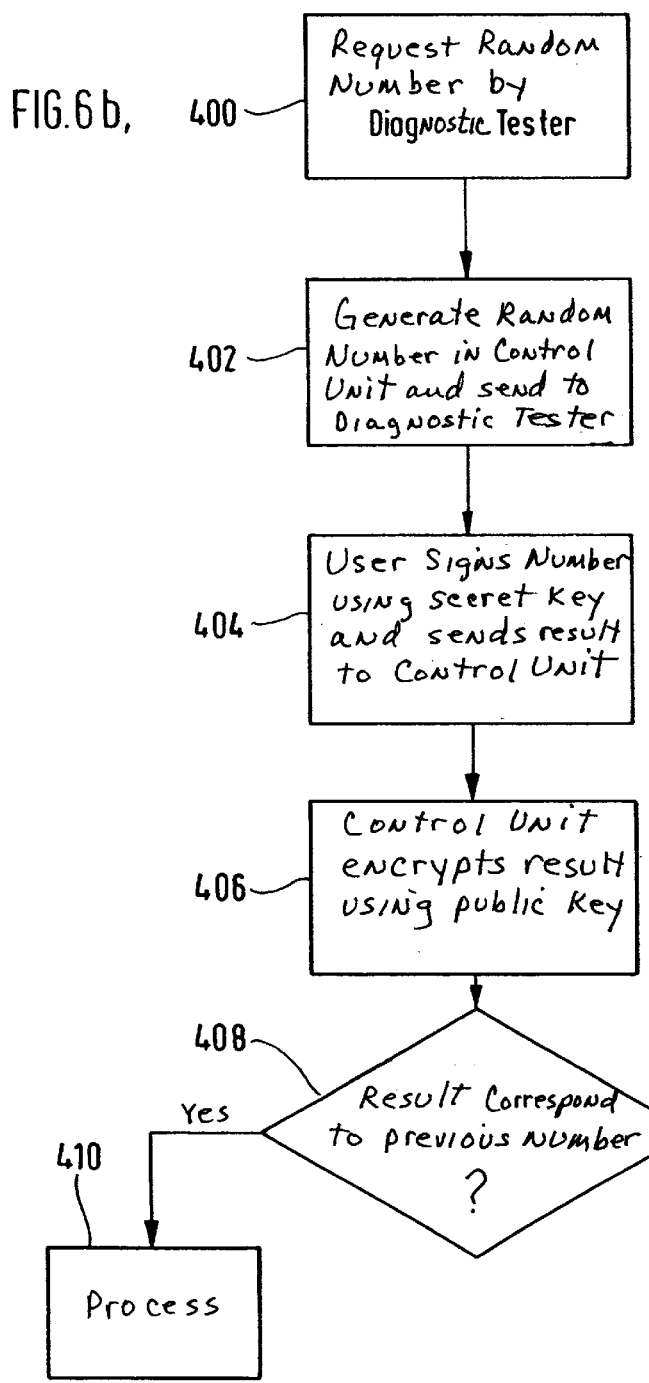
FIG. 6b,

SIGNATURE PROCESS

BACKGROUND AND SUMMARY OF THE INVENTION

This application claims the priority of German patent document 100 08 974.7, filed Feb. 25, 2000, the disclosure of which is expressly incorporated by reference herein.

The invention relates to a process for ensuring the data integrity of software that is imported into a control unit of a motor vehicle.

Recent increasing use of electronics and of communication links in vehicles has precipitated a growing demand for security. For example, microcontrollers, which are used for control purposes in many different areas of the vehicle, are often mutually connected by way of a bus system. In most cases, it is possible (for example, for diagnostic connection) to access this bus from outside the vehicle, and to communicate with the individual control units.

The method of operation of the control units is determined by software programs. Heretofore, the software used in a control unit (controller) has ordinarily been filed in a non-programmable memory (for example, in the case of masked microprocessors), so that the software cannot easily be manipulated. For example, the complete exchange of a memory chip for another memory chip can be detected and a corresponding reaction can take place.

However, the future use of programmable (particularly so-called flash-programmable) control units in the vehicle increases the risk of unauthorized manipulation of the software, and thus the method of operation of the control units. The software could easily be exchanged by unauthorized persons by reprogramming.

For security reasons and to meet legal requirements, measures must be taken either to prevent the changing of original software or to allow only authorized persons to make such changes.

In addition, it may be advantageous in the future to follow a uniform-parts concept, in which the same hardware is used in different models. The difference in the method of operation will then only be the software. This concept requires, of course, that certain software can be run only in an individual vehicle, and cannot easily be copied.

A large number of authentication processes and systems are known from the prior art. For example, U.S. Pat. No. 5,844,986 discloses a process for avoiding unauthorized intervention in a BIOS system of a PC. Based on a so-called public-key process with a public and a secret key, a cryptographic coprocessor, which contains a BIOS memory, authenticates and examines a BIOS change. The examination takes place by checking a digital signature embedded in the software that is to be imported.

European Patent Document EP 0 816 970 discloses a system for examining corporate software. This system for the authentication of a boot PROM memory comprises a memory part with a microcode. An authentication sector comprises a hash generator which generates hash data in response to the implementation of the microcode.

The above-mentioned processes or systems do not, however, permit a direct examination of software to be imported into a control unit of a motor vehicle.

It is therefore an object of the present invention to provide a process for ensuring the authenticity of software imported into a control unit of a motor vehicle.

This and other objects and advantages are achieved by the process according to the invention, in which a pair of keys is first generated for encrypting and decrypting electronic data. (In this context, a "key" generally is a coding and/or decoding parameter, conventional in known cryptographic algorithms). According to the present invention, the software is provided with an electronic signature by means of the first key. For verifying the authenticity of the software, a pertaining second key is filed in (or for) the control unit into which this software is to be imported. By means of this second key, the electronic signature of the software can be checked; if the check is positive, the software is accepted and can be used for controlling the control unit.

According to a first embodiment, a so-called symmetrical process can be used as the encryption, in which the two keys are identical. In fact, there is only one key which is used at different points. However, since the possibility always exists that a key filed in a control unit can be compromised, the security stage of a symmetrical process is not optimal. Such a process can therefore be used only where operations are involved which are not too critical with respect to security. To increase the security level, an additional activating protection can be used in the form of special hardware.

According to another preferred embodiment, an asymmetrical encryption process is selected which has a secret and a public key. In this case, the public key can be filed in, or for access by, the control unit. The software would then be marked by means of the secret key. As an alternative, the control unit or the vehicle itself can generate the asynchronous pair of keys and then file the secret key in the control unit. The public key would then have to be able to be read out, so that it can be used to mark the software. Naturally, in this last alternative, it would have to be ensured that the secret key cannot be read out.

Encryption algorithms with a secret and a public key are referred to as Public-Key processes in which the public key may be publicly known, whereas the secret key is known only at an authorized point, such as a trust center. Such cryptographic algorithms are, for example, Rivest, Shamir and Adleman (RSA Algorithm), Data Encryption Algorithm (DEA Algorithm) and similar algorithms. By means of the secret or public key—analogously to a handwritten signature—, a digital signature to an electronic document can be generated. Only the holder of the secret and/or public key can provide a valid signature. The authenticity of the document can then be checked by verification of the signature by means of the pertaining public and/or secret key. The secret key is sometimes also called a private key.

An unauthorized third party who does not know the correct key is unable to provide a valid signature. When manipulated and not correctly signed software is then loaded into a control unit, this is detected by the pertaining key, and the control unit is, for example, changed to an inoperable condition.

According to another embodiment of the invention, the key is filed in the boot sector of the control unit, which is usually protected in a special manner and cannot easily be overwritten. According to a further embodiment, the boot sector can be "blocked" after the inscription and the input of the key, so that further access, particularly a further inscription, is no longer possible. Thus, it would be ensured that the key filed in the boot sector is protected against manipulation.

In order to provide for the use of the software exclusively for an individual vehicle, the software provided for a control unit of a specific vehicle contains vehicle-individualizing information, such as the chassis number or other vehicle-individual data. This information is assigned to the software or integrated in it. Only after the assignment or integration of these data to or in the software, will this software then be signed by the key provided for this purpose. As described above, a control unit will accept the software only when the signature by means of the other assigned key is unobjectionably recognized.

Because the signature depends on the vehicle-individual information contained in the software, it cannot be subsequently changed. Software can only be fed so that it can be run by a control unit of a vehicle if the vehicle-individual information is not changed and actually corresponds to that of the vehicle. A copying of such vehicle-individualized software to another vehicle is therefore impossible because the vehicle-individual information cannot be changed without violating the signature.

In order to avoid an examination of the software every time a vehicle is started and the control units are run up, such an examination is performed preferably at least during importing of the software. When it is perfectly signed, it can be marked correspondingly, for example, by the setting of a flag, (which can otherwise not be influenced) in the control unit. Thereafter, the software will also be accepted during additional run-ups. In this manner, delays in the normal vehicle start can be avoided in. It should be ensured, however, that this flag cannot be influenced from the outside.

In order to provide another security level during the importation of software in the memories of the control unit, according to another embodiment of the invention, before the importing of the software, it should be possible to access the memory of the control unit only by means of a corresponding authorization. For this purpose, before the signed software is exported, an "unlocking" of the control unit is provided in a log-on step. When different access levels are used during the log-on, in addition, differently designed access rights may be awarded. For example, in the case of a diagnostic access, a logon would first be required, whereby the control unit recognizes by means of the fed access information the access rights and the authorization step connected therewith. Depending on the awarding of rights, the access authorizations may be classified from uncritical to very critical. According to an embodiment, a code is requested by the control unit and is checked with respect to validity. For this purpose, for example, a random number can be generated in the control unit which will then be processed and returned by the accessing party, for example, differently coded or signed. In the control unit, this information will then be examined, for example, by means of its own authentication key.

It is also possible to design the awarding of the access rights dynamically. For example, access certificates can be awarded whose certificate information indicates the access stage. Once an access certificate has been accepted, which can again take place by the checking of a signature by means of a key, the rights listed therein are granted.

Because of the centralization of the security function with respect to the granting of authentication rights, in contrast to the other control units, a control unit provided exclusively for access control should not be freely accessible in the motor vehicle, because, as a result of the physical removal of a control unit, the above-described protection mechanisms could be circumvented. A special (for example, mechanical) removal protection for such a security control unit is therefore desirable.

Furthermore, a special safety level can also be reached by designing a control unit composite, in which various control units are interconnected and are mutually dependent or test one another.

In order to exclude the risk that an individual control unit might be removed and replaced by another, an additional separate control unit removal protection can be useful. For this purpose, for example, a control unit authenticity check is performed sporadically in a vehicle, in which the control units are integrated. An inquiry is therefore directed to control units which these control units must answer by means of a specific expected information. If the information actually emitted by the control unit to be tested does not correspond to the expected information, or if the control unit does not answer, suitable safety measures will be taken.

Control units which are not critical with respect to security can, for example, be excluded from the communication composite. If the control unit is important for the operation of the vehicle, it is, for example, registered, marked or entered into a list so that the hardware-related manipulation on the respective control unit can at least be reconstructed. In one embodiment, the control units must respond upon request by means of a secret authentication key. An illegally exchanged control unit does not have such a key and will then be recognized and treated correspondingly.

Other objects, advantages and novel features of the present invention will become apparent from the following detailed description of the invention when considered in conjunction with the accompanying drawings.

BRIEF DESCRIPTION OF THE DRAWINGS

FIGS. 2a and 2b are schematic representations of the sequence of a digital signature of software as well as its checking;

FIGS. 3a and 3b show the sequence of the digital signature of the software of FIG. 2, represented differently;

FIGS. 6a and 6b show respectively a connection block diagram, and a flow chart for authentication with respect to a control unit.

DETAILED DESCRIPTION OF THE DRAWINGS

Figure 1:
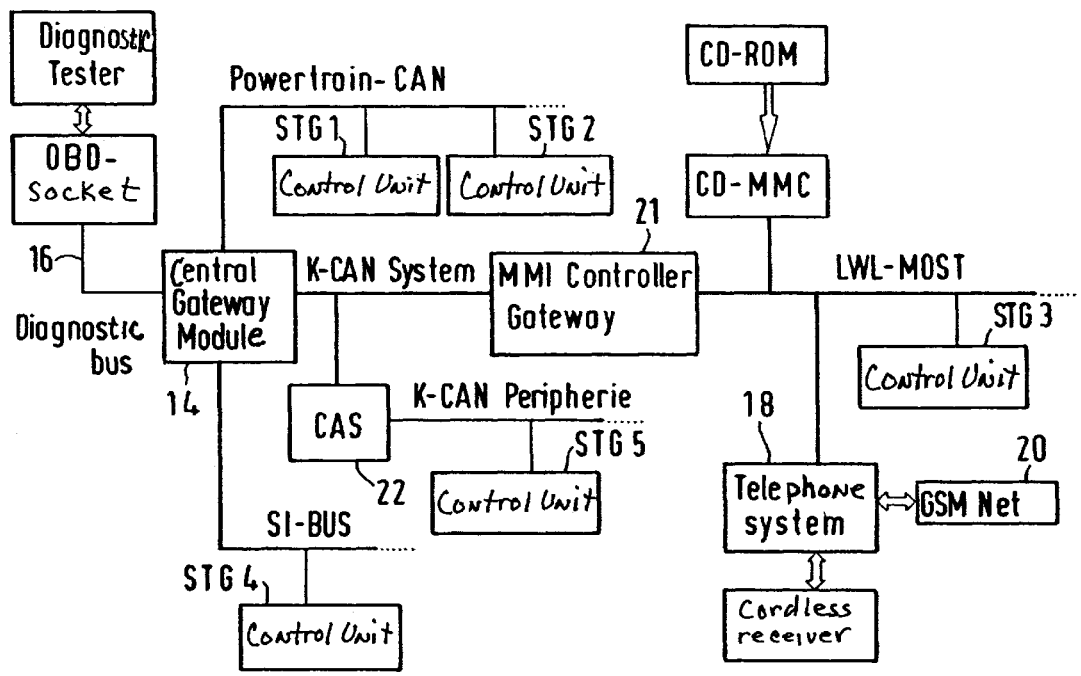
FIG. 1 is a schematic diagram of a control unit structure in a vehicle.

FIG. 1 is a block-diagram of a control unit structure with mutually networked units. The on-board network consists of several subnetworks (LWL-Most, K-CAN System, Powertrain-CAN, etc.) which partially have different transmission speeds and are connected with one another by so-called gateways (e.g., central gateway module 14, controller gateway 21, etc.).

By means of the central gateway 14, a diagnostic bus 16 is indirectly and directly coupled with all other networks. The diagnostic bus 16 represents one of the most import connections to the environment. By way of a diagnostic tester, which is connected to an OBD socket at the end of the diagnostic bus 16, and with the interposition of the central gateway 14, all controllers, gateways and control units in the entire system can be addressed.

As an alternative, it is possible to access the units in the vehicle by way of the GSM network 20 and a telephone system 18 in the vehicle. This permits in principle a remote access to the vehicle on-board network. In this case, the telephone system 18 also represents a gateway between the cellular network (GSM network) and the other vehicle bus users.

A car access system (CAS) 22, which monitors the access to the vehicle, is integrated in the vehicle bus. It contains an electronic drive-away block as another function.

A controller gateway 21 represents an interface between a CD reader and the on-board network. Input by the driver via different instruments is also converted to information by the controller 21, and is transmitted to the respectively addressed control units.

In addition, several control units (STG1 to STG5) are illustrated. The task of a control unit is not only to control a specific unit in the vehicle, but also communication between the units themselves. Communication in the vehicle is "broadcast oriented"; that is, a generator of information which has gained access to the bus, basically sends its information to all control units. For this purpose, the data bus, which is connected with the controller, is permanently monitored. In contrast, during a communication with the environment, for example, by way of the diagnostic bus, each control unit is addressed in a targeted manner by means of an unambiguous address.

In the future, the software which determines the functionality of the control unit will be predominantly housed in a programmable memory, for example, in a flash memory. During a flash programming, only entire blocks can be erased and newly inscribed. The erasing of individual bits is not possible. Different types of microcomputers are used depending on the control units. According to the demands, these are 8-bit, 16-bit or 32-bit processors. All these control units or controllers are available in several variants. They have, for example, a flash memory on board or integrated directly in the processor itself.

The sequence of securing the data integrity of software for a control unit with a flash memory will be explained in detail in the following by means of FIGS. 2a and 2b.

In a first step, a pair of keys consisting of a public key 58 and a secret key 52 is made available by a single authorized party, such as a so-called trust center. In this case, a key is an electronic code by which information can be encrypted and/or decrypted. Known cryptographic algorithms can, for example, be used in this case, such as the above-mentioned RSA or DEA algorithms, thus-called "public-key algorithms" with asynchronous pairs of keys.

The used encryption will be discussed first. In the case of the present authentication process, an asynchronous encryption is preferable. In the case of symmetrical keys, each side must be in the possession of the "secret". As soon as a synchronous key becomes known to authorized third parties, perfect security measure cannot be assured. However, because one key of the pair of keys in the present process must be stored in the control unit of a motor vehicle, where it cannot be ensured that it remains secret, the selection of a symmetrical pair of keys is not advisable.

In contrast to the symmetrical encryption, W. Diffie and M. Hellman in 1976 developed the so-called public-key cryptography. In this type of encryption, a pair of keys is generated which has a public key and a secret key. By means of the secret key, a signature of an electronic document can be carried out. This signature is unique and, as a rule, cannot be reconstructed. The signature can be checked by means of the public key.

The public-key process has the advantage that one key of the pair of keys can be publicly known. However, the public-key processes known today are very computing-intensive, hybrid processes, so that a combination of symmetrical and asymmetrical processes are frequently used. In the case of the hybrid process, a symmetrical key is exchanged by means of a public-key process between the communication partners. The actual communication will then be encrypted by means of the symmetrical key.

By separating secret and public keys, authentication procedures and digital signatures can be implemented as described above. As a result of the possession of the secret key, an identity can be unambiguously proven and a signature can be executed as in the case of a handwritten signature. A known public-key crypto system is the above-mentioned RSA process. Other public-key crypto processes are based on problems relating to the computing of logarithms in certain mathematical groups (discrete logarithm problem).

In order to digitally sign a document, the sole authorized party encrypts the document by means of the secret key and attaches a signature value to the document. To verify the signature, it is decrypted by means of the public key and the resulting value is compared with the original document value. If both document values correspond to one another, the signature is valid and the software can be accepted.

In this case, one public key respectively is stored by the authorized party during the vehicle production in each control unit of a vehicle, which should be modifiable with respect to the software (for example, transmission control unit).

Figure 4:
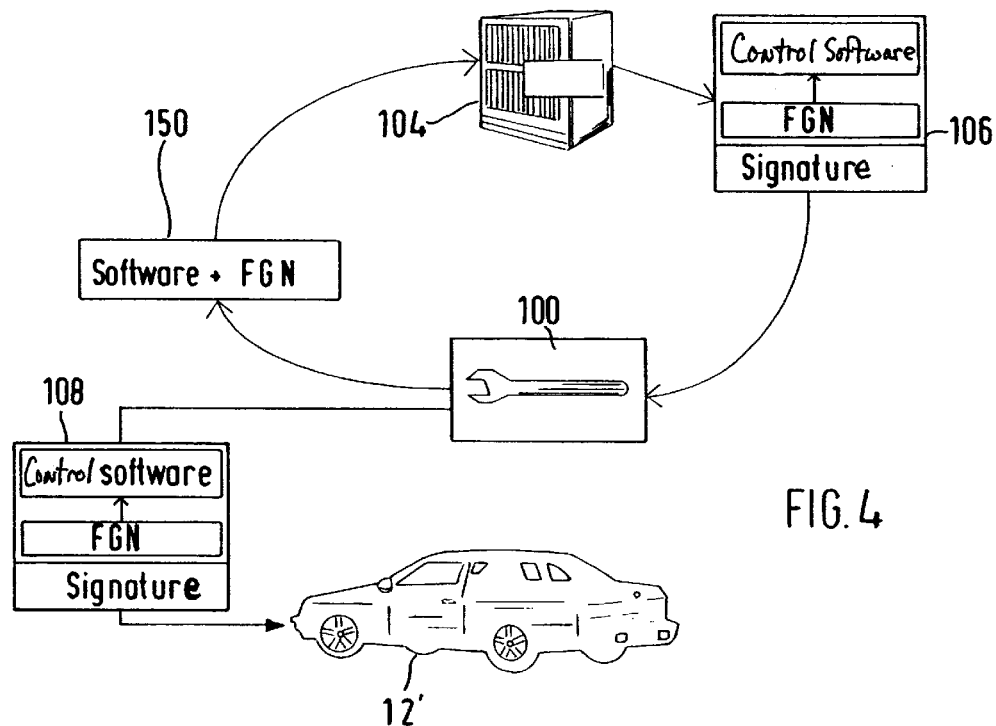
FIG. 4 illustrates the sequence of the execution of a signature by a trust center.

A customer now orders at a dealer 100 (FIG. 4) a specific additional function for his motor vehicle, for example, a specific shifting characteristic when selecting transmission positions. This function can be implemented by importing new software into a transmission control unit of the respective vehicle. The dealer 100 provides such software 150 and sends it, together with the chassis number of the customer's vehicle, to the trust center 104 which is solely authorized to sign this software. In the trust center 104, the software, together with the transmitted chassis number, is signed by means of the secret key.

This approach is also illustrated in FIG. 2a (software 50, secret key 52), although no chassis number is transmitted here.

The signed software 106 (compare FIG. 4 and reference number 56 in FIG. 2a) is then transmitted back to the dealer 100 who can import it into the customer's motor vehicle 12.

The transmission to the trust center 104, the signing and the return transmission can be implemented relatively fast electronically.

In the next step, the signed software 56, 106 is imported by the dealer 100 into the vehicle 12, more precisely, into the transmission control unit. The transmission can take place by way of the diagnostic socket and the diagnostic bus 16 (FIG. 1). Alternatively, it can be imported in a remote-controlled manner via the GSM network.

Figure 7:
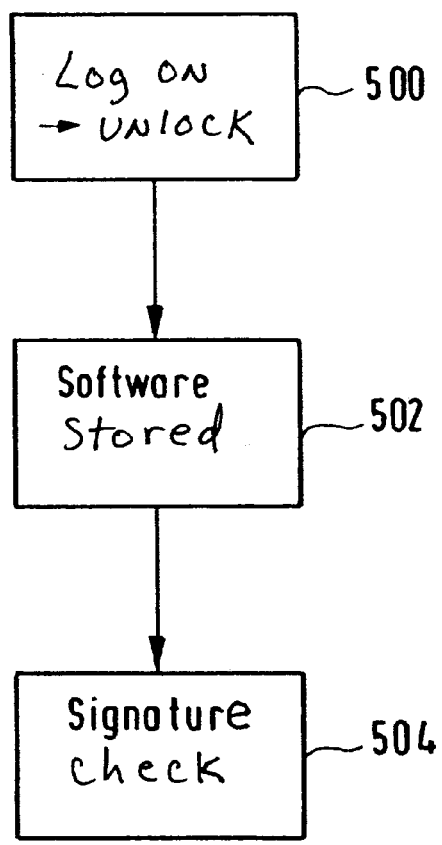
FIG. 7 is a flow chart for reading software into a control unit.

During the importing, a log-on and identification of the dealer (compare step 500 in FIG. 7) first takes place. For this purpose, the dealer 100 sends a control unit address and a pertaining identification to the vehicle. If the identification is successful, the control unit (here: the transmission control unit) is switched ready for the reading-in of new software. This permits the reading-in (also flashing) of new software into the control unit (compare 502 in FIG. 7). After the importing of the new software into the control unit, the dealer 100 has done his part.

During the run-up of the next operation, the control unit 24 (FIG. 2) checks the signature of the imported new software 56 by means of the public key 58, as shown in detail in FIG. 2b. By means of the public key 58, a value is determined from the signature in a unit 60 of the control unit 24, which value must correspond to the electronic document 62 which had been encrypted. This conformity is checked in a comparator 64. If a conformity exists, the imported software 50 is accepted and the control unit 24 is operated by means of this software. If there is no conformity, the control unit 24 is marked and is stored in a list. The data of this list can then be read out during a diagnosis. Another opportunity is then provided for importing correct software. If no correctly signed software is imported, the vehicle can no longer be operated.

FIGS. 3a and 3b are slightly more detailed views of the encryption and the decryption. When the software is signed, not all software is signed. This would be inefficient. On the contrary, a so-called hash code 51 is generated from the software by way of a hash function which is known per se. This hash code 51 is a digital information of a defined length. According to the security demand, a length of, for example, 16 bits, 64 bits or 128 bits can be selected. It is only this hash code 51 which will then be signed (signature 54) and the signature is attached to the software 50. The signing of the hash code is significantly more efficient than the signature of long software documents.

The hash functions have the following important characteristics: It is difficult to find a value M of a document that corresponds to a given hash value h, (one-way function). It is also difficult to find a collision, that is, two values with M and M' at which the hash values are identical (collision resistance).

When checking the signature 50, a hash value 51' is determined by applying the public key to the signature (reference number 53 in FIG. 3b), which hash value 51' is compared with the actual hash value 51 of the software 50 in a comparator 66. If the two hash values correspond to one another, the software 50 is accepted. It will then be authentic software and the control unit can be operated by means of the imported software. If the comparison is not positive, the control unit terminates its operation and waits until perfect software with a proper signature has been imported.

In addition of the above-described authentication sequence, a so-called challenge response process is frequently also used for authenticating a communication partner A with respect to a communication partner B. In this case, B first sends a random number RND to A. A signs this random number by means of his secret key and sends this value as a response to B. B verifies the response by means of its public key and checks A's authentication.

Such an authentication is illustrated in FIGS. 6a and 6b. FIG. 6a illustrates the communication loop between a diagnostic tester and a control unit. During the authentication according to the challenge response procedure, a user sends by means of the diagnostic tester first an information with a defined access level LI to the control unit and requests a random number from the control unit (step 400). The control unit responds with the transmission of a random number (step 402). In the diagnostic tester, the random number is signed by means of a secret key and the result is then sent back to the control unit (step 404). In the control unit, the random number is again determined from the signature by means of the public key. If the thus computed number corresponds to the random number previously transmitted by the control unit, the access is enabled for this user by means of the desired security stage for the duration of the diagnostic process. As a result, in the case of a corresponding security classification, he can read software into the memory of a control unit.

In the following, customization of the software is described for a specific vehicle. With reference to the signing process according to FIG. 4, it had been mentioned that, by means of the software, a vehicle identification is transmitted which applies only to a specific vehicle. The software is then signed together with the vehicle identification (such as the chassis number) and the packet is sent back to the dealer. The signature was received in the hash code (described in the embodiment according to FIGS. 3a and 3b) which thereby also decisively influences the signature.

As described above, the control unit accepts only correctly signed software. If the signature is correct, it is also checked whether the vehicle identification assigned to the software actually corresponds to that of the vehicle. If so, the software would be cleared. By means of this approach, the vehicle-individualized software can be used only in a specific target vehicle. For a different vehicle, other software has to be produced which is provided with an individual signature.

In order to be able to customize software, the vehicle chassis number should be registered already during the production in the corresponding control units in a manner which cannot be manipulated. The vehicle chassis number must still be present in the control unit even erasure of a memory. This can be achieved for example by storing the chassis number, in the above-mentioned and especially protected car access system, in a nonvolatile and non-exchangeable memory.

Figure 5:
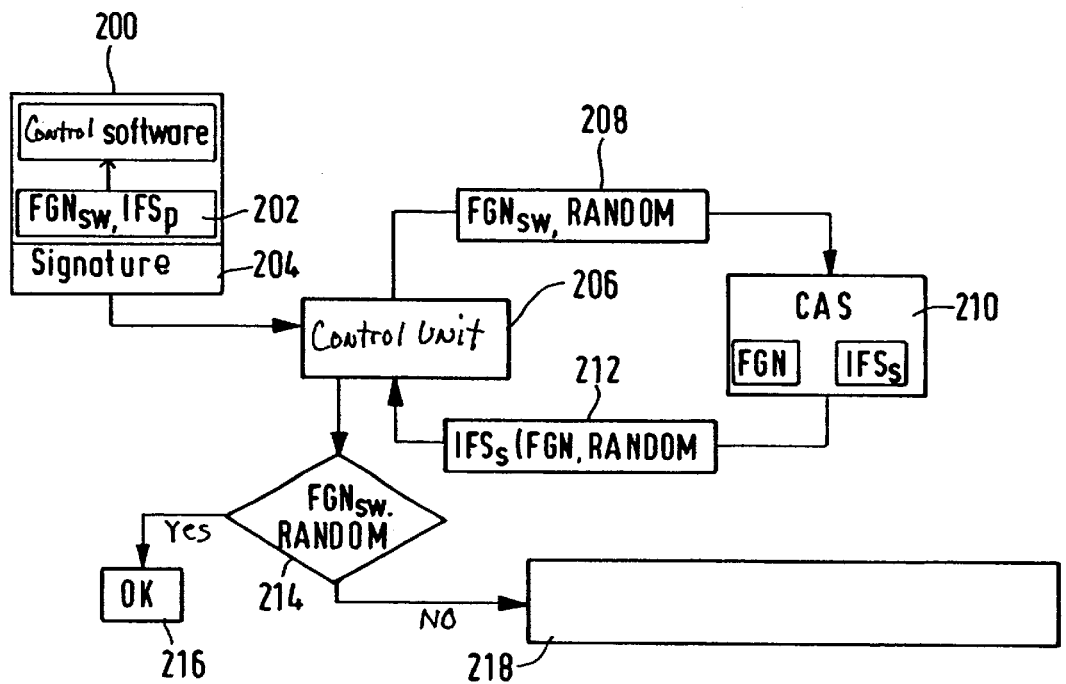
FIG. 5 shows an algorithm for a special testing procedure of vehicle-individual information.

The following approach according to FIG. 5 ensures a query which cannot be manipulated. In addition, to the chassis number, another vehicle-individual pair of keys is required which consists of a secret key IFSs and a public key IFSp. The assignment of the chassis number and of the two keys takes place at a central point, thus in the trust center. The secret key IFSs is stored in a car access system 210, specifically in a non-retrievable form.

Currently, the chassis number is already situated in the access area of the car access system 210.

In the software to be newly imported, in addition to the chassis number, the public vehicle-individual key ISPp 202 will now also be filed (step 200 in FIG. 5). Subsequently, the entire software in the trust center is secured by the signature 204. After the importing of the software into the control unit, the correctness of the signature 204 is first tested.

Subsequently, the control unit 206 checks by means of the previously described challenge response inquiry whether the chassis number in the software corresponds to that of the vehicle. For this purpose, the control unit 206 sends the chassis number FGNsw contained in the software and a random number RANDOM to the car access system 210. There the stored chassis number FGN is compared with the received chassis number FGNsw. Subsequently, the two values are signed by means of the secret key IFSs and are sent back to the control unit 206. By means of the public key IFSp, the control unit can now check the signed transmission and compare the obtained values with the challenge value which was sent initially to the car access system. If the values correspond to one another, the software can be accepted (step 216, o.k.). Otherwise, the software is not accepted (step 218, no).

As a variant of this process, instead of an individual pair of keys IFSs and IFSp, a corresponding pair of keys which is not vehicle-individualized can be used which is already stored in the vehicle. As a result, the management for this key is eliminated. Likewise, a corresponding mechanism with a symmetrical cryptographic process is naturally conceivable. Although this has advantages during the processing, it has the risk that the symmetrical key may be read out of the control units.

Of course, it should be ensured in all above-mentioned processes that the secret keys of the trust center remain secret. On the whole, the above-mentioned cryptography offers an effective way to ensure that only proper software is imported into (vehicles or into defined vehicles), thus preventing unauthorized manipulations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for ensuring data integrity of software for influencing operation of a control unit of a motor vehicle, which software can be stored in a memory of the control unit, said process comprising:

providing first and second keys for encrypting and decrypting electronic data;

filing the first key for access by a control unit in the motor vehicle;

by means of the second key, signing software which is to be imported;

importing the signed software into the memory of the control unit;

checking the signature of the software by means of the first key; and accepting the imported software when the checking has a positive result.

2. The process according to claim 1, wherein a symmetrical pair of keys is used in which both keys are identical.

3. The process according to claim 1, wherein an asymmetrical pair of keys with a secret and a public key is used.

4. The process according to claim 3, wherein:

the public key is filed for access by the control unit; and the software is signed by means of the secret key.

5. The process according to claim 3, wherein:

a control unit in the vehicle generates an asynchronous pair of keys;

the secret key is filed in the vehicle, particularly in a control unit; and the public key can be read out of the vehicle for signing software.

6. The process according to claim 1, wherein the key filed in the control unit is filed in a boot sector thereof.

7. The process according to claim 6, wherein after inscribing and input of the key, the boot sector is blocked and is thus protected against further access, including a writing access.

8. The process according to claim 1, wherein:

the software is first imaged on an information having a defined length; and said information is then signed.

9. The process according to claim 8, wherein a hash function is selected as the imagining function.

10. The process according to claim 1, wherein:

at least one vehicle-individual information of a vehicle containing the control unit is added to the software;

at least one vehicle-individual information is signed by means of the software;

in addition to checking the signature of the software, the vehicle-individual information is also checked; and the software is accepted in the control unit only when the vehicle-individual information of the software also corresponds to that of the vehicle.

11. The process according to claim 10, wherein:

for checking the vehicle-individual information, a vehicle-specific pair of keys is produced, in a vehicle security unit, the vehicle-individual information and a first key of the pair of keys being present, in addition to the vehicle-individual information, the second key of the pair of keys being filed in the software; and in a separate routine, a check is made in the vehicle whether the two keys of the pair of keys match, in order to accept the imported software if the answer is affirmative.

12. The process according to claim 1, wherein the software is tested at least during a first running-up of the control unit, and is then correspondingly marked.

13. The process according to claim 1, wherein in the event of an external access to the control unit, an access unit checks whether an authorization exists for the access.

14. The process according to claim 13, wherein a code is requested by a control unit and the code is checked for validity.

15. The process according to claim 13, wherein:

a control unit supplies a random number which is to be signed by the accessing party; and the signature is checked in the control unit, by means of an authentication key.

16. The process according to claim 13, wherein:

when access authorization is queried, an authorization stage is determined; and access actions are accepted or not accepted as a function of the authorization stage.

17. The process according to claim 1, wherein a security device in a vehicle at least aperiodically carries out an authentication test of a control unit and registers the control unit in the event of a negative result.

18. The process according to claim 17, wherein a control-unit-specific secret code is filed in the control unit.

19. The process according to claim 17, wherein the security device queries a control-unit-specific characteristic and checks the latter with respect to authenticity.

20. The process according to claim 17, wherein during the authentication check, a key is used which is filed in at least one of the security device and in the control unit.

* * * * *